(No Model.) 2 Sheets—Sheet 1.

J. MASLEN.
HORSESHOE.

No. 529,930. Patented Nov. 27, 1894.

WITNESSES:
Paul Johot
W. B. Hutchinson

INVENTOR
J. Maslen
By Munn & Co.
ATTORNEYS.

(No Model.) 2 Sheets—Sheet 2.

J. MASLEN.
HORSESHOE.

No. 529,930. Patented Nov. 27, 1894.

WITNESSES:
Paul Johot
W. R. Hutchinson

INVENTOR
J. Maslen
BY
Munn & Co
ATTORNEYS.

UNITED STATES PATENT OFFICE.

JAMES MASLEN, OF NEW YORK, N. Y.

HORSESHOE.

SPECIFICATION forming part of Letters Patent No. 529,930, dated November 27, 1894.

Application filed March 17, 1894. Serial No. 503,986. (No model.)

*To all whom it may concern:*

Be it known that I, JAMES MASLEN, of New York city, in the county and State of New York, have invented a new and Improved Horseshoe, of which the following is a full, clear, and exact description.

My invention relates to improvements in horseshoes, and the object of my invention is to produce a simple and inexpensive horseshoe, which may be readily adapted for different purposes, such as for use on draft horses or trotting horses, which may be worn without injury to the hoof, which may be easily applied and removed, and which is very durable.

To these ends, my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1:
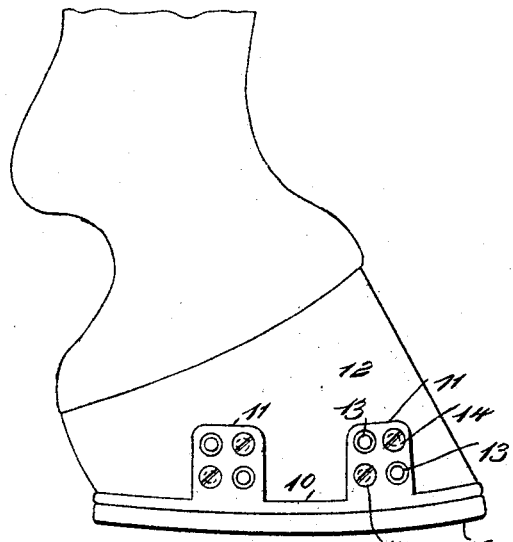
Figure 2:
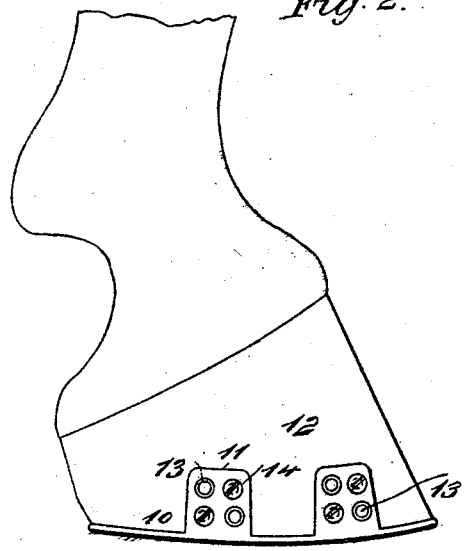
Figure 3:
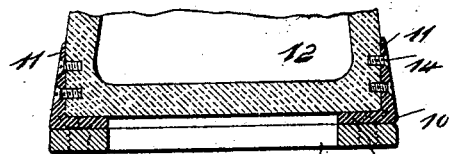
Figure 4:
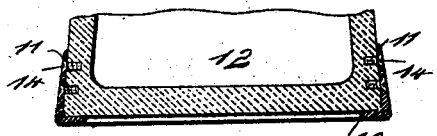
Figure 5:
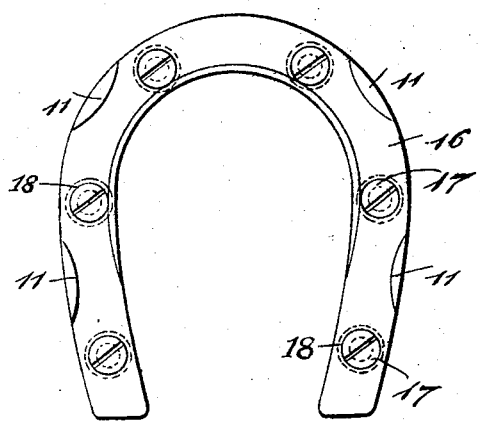
Figure 6:
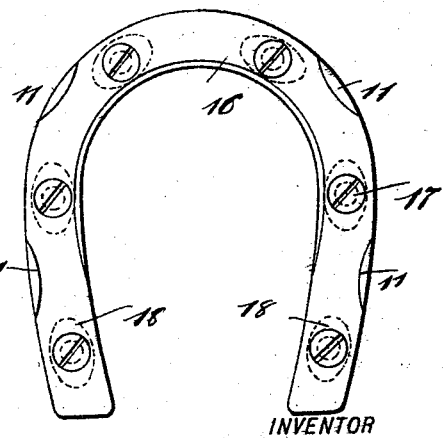
Figure 7:
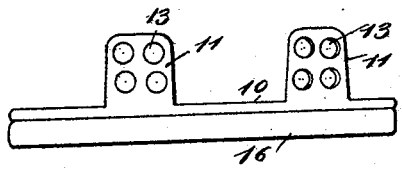
Figure 8:
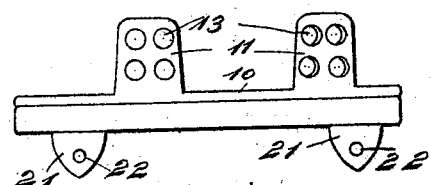
Figure 9:
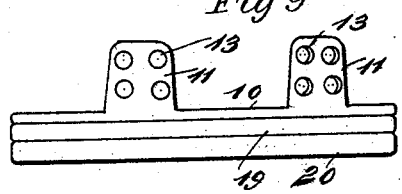
Figure 10:
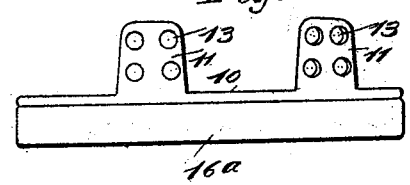
Figures 11, 12, 13, 14:
Figure 15:
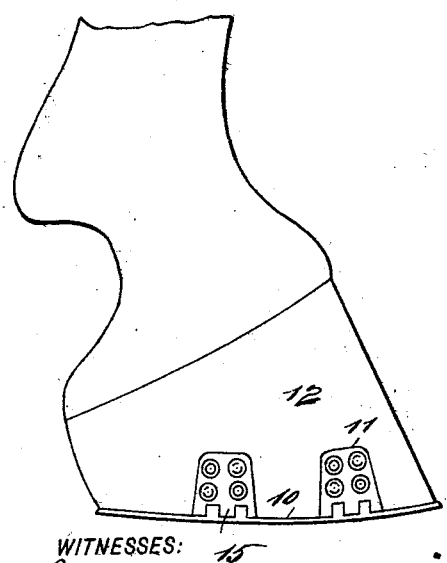
Figure 16:
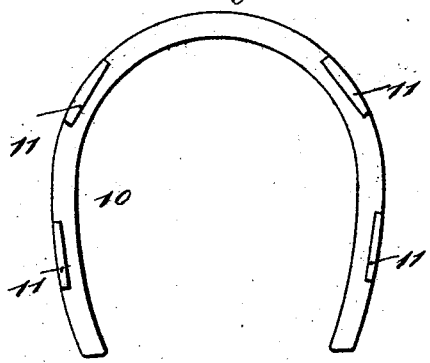

Figure 1 is a side elevation of my improved shoe as applied to a horse's hoof, the shoe being provided with a sole. Fig. 2 is a similar view, with the sole removed. Fig. 3 is a cross sectional view of the shoe with the sole applied to the hoof. Fig. 4 is a similar view of a soleless shoe. Fig. 5 is a plan view of the shoe. Fig. 6 is a plan view of the shoe, and shows also the outlines of nuts embedded in the sole. Fig. 7 is a detail side elevation of the shoe with the sole. Fig. 8 is a similar elevation, but with the shoe provided with calks. Fig. 9 is a side elevation of a shoe having a double leather sole. Fig. 10 is a side elevation of a shoe provided with a thick rubber sole. Fig. 11 is a detail cross section showing the manner of applying the sole to the bed-plate. Fig. 12 is a similar section, but showing also the means of attaching a calk. Figs. 13 and 14 are detail transverse and longitudinal sections showing the manner in which a nut is held in the rubber or leather soles. Fig. 15 is a side elevation of a modified form of the bed-plate and attaching flanges, the same being shown applied to a hoof. Fig. 16 is a plan view of the bed-plate; and Fig. 17 is a cross sectional view of a modified form of bed-plate as applied to a hoof.

The shoe embodying my invention is provided with a light bed-plate 10 which is preferably of steel, and which may be made of any necessary size, this plate having on opposite edges upwardly-extending flanges 11, which are adapted to fit against the hoof 12, and in which are holes 13 to receive fastening screws 14, by which the flanges and the bed-plate are attached to the hoof. The screws are of such a length that they will not penetrate through the shell of the hoof, and in applying them, they are placed diagonally, as shown in Fig. 1, but two screws being placed in each flange, and when the hoof is pared down and the bed-plate reapplied, the screws are placed in the opposite pair of holes and thus the destruction of the hoof is prevented.

Figure 17:
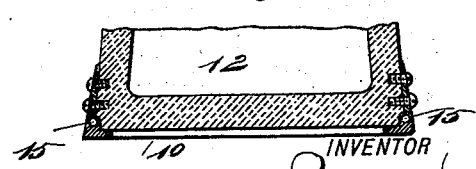

Instead of having the flanges 11 made integral with the bed-plate 10, they may be hinged, as shown in Figs. 15 and 17. For a very light shoe no sole is used, the bed-plate being used alone, as shown in Fig. 2, but for heavier use, the shoe is provided with a sole 16, which is fastened to the bed-plate by means of screws 17 projecting downward through the bed-plate and into the sole.

The sole may be of metal or of leather, rubber or any suitable material. If leather or rubber is used, a nut 18 is embedded therein, as shown in Figs. 5, 6, 13, and 14, and the screw 17 made to enter said nut.

Fig. 9 shows a sole made up of two layers 19 and 20 of leather, and in such construction the nut may be embedded in the upper layer. If a calk 21 is used, it may be of any desired shape, and it is applied by means of the screw 17, which is made longer so as to project downward through the sole and into the calk, and the calk is also provided with a transverse hole 22 beneath the screw, through which a pin may be passed to tighten it.

It will be seen from the above description that this shoe may be easily applied to a hoof, or as easily removed, and it will be understood that it may be made of any necessary size or shape and of any suitable material.

The soles 16 may be made of steel sharpened for use on ice or packed snow.

Having thus described my invention, I claim as new and desire to secure by Letters Patent—

1. A horseshoe, comprising a bed-plate having upwardly-extending perforated flanges hinged thereon, substantially as specified.

2. The combination with the bed-plate, of a detachable sole thereon, removable calks, and fastening screws extending through the bed-plate and sole and into the calks, substantially as specified.

3. A horseshoe comprising the metallic bed plate to fit the hoof and provided with counter-sunk screw holes, the sole formed of yielding material having dovetail or undercut recesses in its upper face, dovetail nuts in the said recesses and flush with the upper face of the sole, and screws passed down through the apertures in the bed plate into the said nuts, substantially as shown and described.

JAMES MASLEN.

Witnesses:
ALFRED LARTER,
JAMES J. HARGRAVE.